(12) United States Patent
Fujita et al.

(10) Patent No.: US 8,228,665 B2
(45) Date of Patent: Jul. 24, 2012

(54) GAS INSULATED SWITCHGEAR

(75) Inventors: Daisuke Fujita, Tokyo (JP); Takuya Otsuka, Tokyo (JP); Hitoshi Sadakuni, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 283 days.

(21) Appl. No.: 12/739,974

(22) PCT Filed: Nov. 1, 2007

(86) PCT No.: PCT/JP2007/071333
§ 371 (c)(1),
(2), (4) Date: Apr. 27, 2010

(87) PCT Pub. No.: WO2009/057218
PCT Pub. Date: May 7, 2009

(65) Prior Publication Data
US 2010/0254073 A1    Oct. 7, 2010

(51) Int. Cl.
H02B 13/02    (2006.01)

(52) U.S. Cl. ........ 361/612; 361/604; 361/618; 361/621; 361/634; 218/10; 218/12; 218/78; 218/80

(58) Field of Classification Search .................. 361/602, 361/604–605, 612, 618–621, 624, 634
See application file for complete search history.

(56) References Cited

U.S. PATENT DOCUMENTS

| | | | |
|---|---|---|---|
| 4,503,481 A * | 3/1985 | Fujiya et al. | 361/612 |
| 5,991,148 A * | 11/1999 | Heil et al. | 361/605 |
| 6,560,091 B1 * | 5/2003 | Takahoshi et al. | 361/604 |
| 6,624,372 B1 * | 9/2003 | Ogawa et al. | 218/71 |
| 7,457,105 B2 * | 11/2008 | Kikukawa et al. | 361/605 |
| 7,515,398 B2 * | 4/2009 | Takao et al. | 361/612 |
| 7,903,394 B2 * | 3/2011 | Sadakuni et al. | 361/612 |
| 2006/0215356 A1 * | 9/2006 | Takao et al. | 361/612 |

FOREIGN PATENT DOCUMENTS

DE    35 35 938 A1    4/1987
(Continued)

OTHER PUBLICATIONS

Interrogation from Japanese Patent Office issued in corresponding Japanese Patent Application No. 2009-538893 dated Jan. 25, 2011, with English translation thereof.
(Continued)

*Primary Examiner* — Courtney Smith
(74) *Attorney, Agent, or Firm* — Buchanan Ingersoll & Rooney PC

(57) ABSTRACT

The object is to provide ring-bus-type gas insulated switchgear that ensures maintenance and inspection performance, reduces the installation space, and further reduces costs. Each of a plurality of breaker units is formed by connecting an instrument current transformer and a disconnector to each of the upper and lower branch ports drawn horizontally from the side surface of a vertical breaker in the same direction, and the breaker units are arranged in parallel. Adjacent disconnectors are connected to each other by a connection bus, so that the bus route runs alternately at upper and lower levels. Furthermore, the breaker units positioned at the two ends are connected linearly to each other by a communication bus. In addition, the line-side devices are arranged to face the corresponding breaker units across the disconnectors.

12 Claims, 9 Drawing Sheets

FOREIGN PATENT DOCUMENTS

| | | |
|---|---|---|
| EP | 0 156 107 A1 | 10/1985 |
| JP | 56-19310 A | 2/1981 |
| JP | 57-211915 A | 12/1982 |
| JP | 58-139608 A | 8/1983 |
| JP | 63-77411 U | 5/1988 |
| JP | 02-023008 | 1/1990 |
| JP | 02-254908 | 10/1990 |
| JP | 2-254908 A | 10/1990 |
| JP | 5-33610 U | 4/1993 |
| JP | 6-276627 A | 9/1994 |
| JP | 8-223716 A | 8/1996 |
| JP | 2001-016720 | 1/2001 |
| WO | WO 01/24333 A1 | 4/2001 |

OTHER PUBLICATIONS

Office Action (Notice of Rejection) dated May 24, 2011, issued in the corresponding Japanese Patent Application No. 2009-538893, and an English Translation thereof.

Office Action dated Dec. 12, 2011, issued in the corresponding Chinese Patent application No. 200780101406.7. (7 pages).

International Search Report dated Jan. 22, 2008.

Preliminary Report of the International Searching Authority dated Jan. 22, 2008.

Supplementary European Search Report dated Jan. 27, 2012, issued in the corresponding European Patent Application No. 07831067.9. (5 pages).

* cited by examiner

GAS INSULATED SWITCHGEAR

TECHNICAL FIELD

The present invention relates to a gas insulated switchgear of a ring bus type.

BACKGROUND ART

Gas insulated switchgear used in electric-power-related facilities such as substations and power plants is configured with essential devices such as switchgear, buses, current transformers, disconnectors, and voltage transformers arranged in a sealed metal container filled with arc-extinguishing gas such as sulfur hexafluoride ($SF_6$) that exhibits high insulating and arc-extinguishing properties. Gas insulated switchgear is advantageous to air insulated switchgear from the viewpoint of reduced footprint. With the rise of land costs and the like, however, there have been demands for further footprint reduction by arranging the constituent devices in a still more practical manner.

There are different bus types for the gas insulated switchgear, one of which is called a ring bus type. According to the ring bus type, the entire structure is shaped into a ring form by connecting, in series, units in which an instrument current transformer and a disconnector are provided on each side of a breaker, branching line-side devices from each of the units, and connecting the two ends of the serially connected units by a bus. In a device of the ring bus type, if an accident occurs in any of the units, only power transmission and reception lines connected to this unit should be stopped. Because the power transmission and reception can be continued with other units, high reliability can be attained in power supply.

In the ring-bus-type gas insulated switchgear according to Patent Document 1, breaker units are formed with vertical breakers, and current transformers and disconnectors connected to the sides of the breakers by way of horizontal branches (T branches) provided on the top portions of the breakers are formed, and such breaker units are arranged in a direction perpendicular to the T branches. Moreover, these breaker units are connected in series alternately by the first connection bus unit and the second connection bus unit in the form of rectangular waves on a horizontal surface at approximately the same level as the T branch, and the breaker units at the two ends of the alignment direction of the breaker units are connected to each other by a regression bus unit. In addition, the first and second connection bus units that connect the breaker units to one another are connected to line-side units.

Furthermore, in the ring-bus-type gas insulated switchgear according to Patent Document 2, in which breaker units including vertical breakers and disconnectors connected the two ends of each of the breakers and lead line units including line-side devices are alternately connected in the form of rectangles, the breaker units and the lead line units are arranged outside the rectangular line.

Patent Document 1: International Publication Pamphlet No. WO 01/024333
Patent Document 2: Japanese Patent Application Laid-open No. 2-254908

DISCLOSURE OF INVENTION

Problem to be Solved by the Invention

The following problems reside in the above conventional technologies, however.

That is, in the gas insulated switchgear according to the Patent Document 1, because the breaker is situated in the center of each breaker unit, additional space is required between the breaker units for maintenance and inspection of the breaker and the like, which increases the installation space. Furthermore, because the line-side units are arranged alternately on the left and right sides of the alignment direction of the breakers, the dimension in the longitudinal direction of units increases in comparison with the arrangement where the units are positioned on either right or left side, and as a result, the installation space increases. In addition, the bus positioned at a high level requires a large number of supporting stands, which increases the costs and also becomes disadvantageous to its earthquake-resistant design. Furthermore, because the breaker is in vertical configuration and a conductor is folded over inside the breaker to form a T-branch structure, the interior structure of the breaker becomes complicated. This adversely increases the diameter of the breaker tank and also increases the production costs.

Further, in the gas insulated switchgear according to the Patent Document 2, the breaker units and the lead line units are alternately arranged outside the rectangular bus. In other words, each of the lead line units is folded over and positioned between the breaker units, and therefore space for two units is actually required in the unit-to-unit direction. This adversely increases the installation space.

The present invention has been made in light of the above and an object of the invention is to provide ring-bus-type gas insulated switchgear that reduces the installation space while facilitating the maintenance and inspection, and also reduces the costs.

Means for Solving Problem

A gas insulated switchgear according to an aspect of the present invention is a gas insulated switchgear in which a plurality of breaker units are connected in series to form a ring bus and line-side devices are branched from between the breaker units, each of the breaker units including a vertical breaker provided with two branch ports that are an upper port and a lower port and are branched horizontally from a side surface thereof in the same direction, and an instrument current transformer and a disconnector that are connected in this order to each of the two branch ports. The two branch ports of each of the breaker units face the same direction, the breaker units are arranged linearly in a direction orthogonal to the same direction, upper disconnectors or lower disconnectors of any two adjacent breaker units are connected by a connection bus, and the connection bus is arranged to run alternately at upper and lower levels with respect to an alignment direction of the breaker units. A disconnector of two disconnectors of a breaker unit positioned at one end of the alignment direction, which is not connected to a disconnector of an adjacent breaker unit to the breaker unit, is connected by a communication bus to a disconnector of two disconnectors of a breaker unit at the other end of the alignment direction, which is not connected to a disconnector of an adjacent breaker unit to the breaker unit, so that the breaker units at the two ends of the alignment direction communicate with each other. At least one of two disconnectors of each of the breaker units is connected to the line-side devices, and the line-side devices are arranged to face the breaker units across the disconnectors.

Effect of the Invention

According to the present invention, breaker units are each provided with two branch ports facing the same direction, and are arranged linearly in a direction perpendicular to this direction. Moreover, the line-side devices are positioned on the side of the disconnectors opposite to the breaker units. Thus, the devices are gathered on the front and back sides of the breaker units. In other words, because the breakers are positioned mainly on the front side of the breaker units, while the line-side devices are positioned mainly on the back side of the breaker units. Thus, accessibility to the devices containing these components is improved, and space necessary for maintenance and inspection is automatically ensured in the structure. For this reason, space for the device maintenance and inspection does not need to be specially designed, and the installation space is reduced. Moreover, the breaker units and the units of the line-side devices connected thereto are arranged in parallel, so that the dimensions between the units and also in the longitudinal direction of the units can be reduced. As a result, the layout of the entire electric-power facility in which the gas insulated switchgear is installed can be integrated, and the footprint can be easily reduced.

Furthermore, the structure according to the present invention incorporates a vertical breaker having two branch ports that are vertically spaced apart from each other, and a connection bus is connected to a disconnector that is connected to this breaker by way of an instrument current transformer. In comparison with conventional technologies in which a current transformer and a disconnector are connected to a vertical branch (T-branch) provided on top of a vertical breaker, the bus does not have to be positioned at an upper level. Thus, the device can be arranged at a lower level, and the number of supporting stands can be largely reduced. This reduces the costs and improves the earthquake resistance. In addition, because such vertical breakers are incorporated, a structure in which the conductor is folded over inside the breaker or the like is not required. Thus, the conductor routing is simplified, which reduces the diameter of the breaker. For this reason, the distance between the units can be reduced, and the installation space can be further reduced.

EXPLANATIONS OF LETTERS OR NUMERALS

Figure 1:
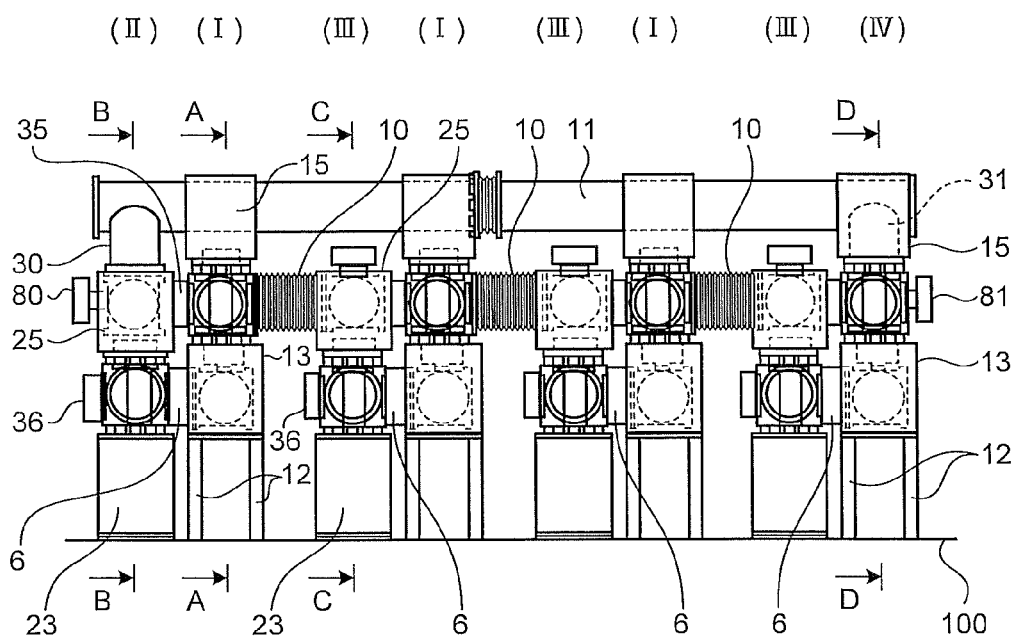
FIG. 1 is a front view of an example arrangement of ring-bus-type gas insulated switchgear according to the first embodiment.

1 Breaker
2, 20, 21, 22, 27, 35, 36, 80, 81 Operating devices
3, 7, 30, 31, 38, 39 Branch ports
4, 8 Instrument current transformers
5, 9, 17, 28 Disconnectors
6, 10, 37 Connection buses
11 Communication bus
12 Supporting stands
13, 23 Cable heads
14, 24 Line-side disconnectors
15, 25 Instrument transformers
16, 26 Grounding switches
18, 29, 40 Connection terminals
100 Installation surface

BEST MODE(S) FOR CARRYING OUT THE INVENTION

Exemplary embodiments of the gas insulated switchgear according to the present invention are explained in detail below with reference to the drawings. These embodiments are not to limit the present invention.

First Embodiment

Figure 2:
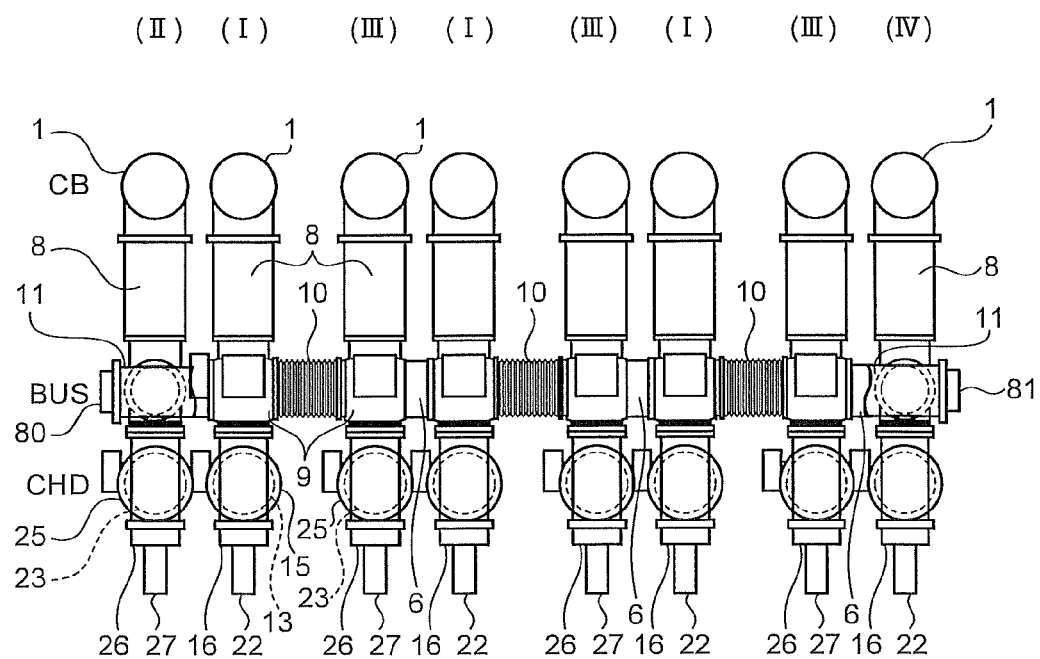
FIG. 2 is a top view corresponding to FIG. 1.
Figure 3:
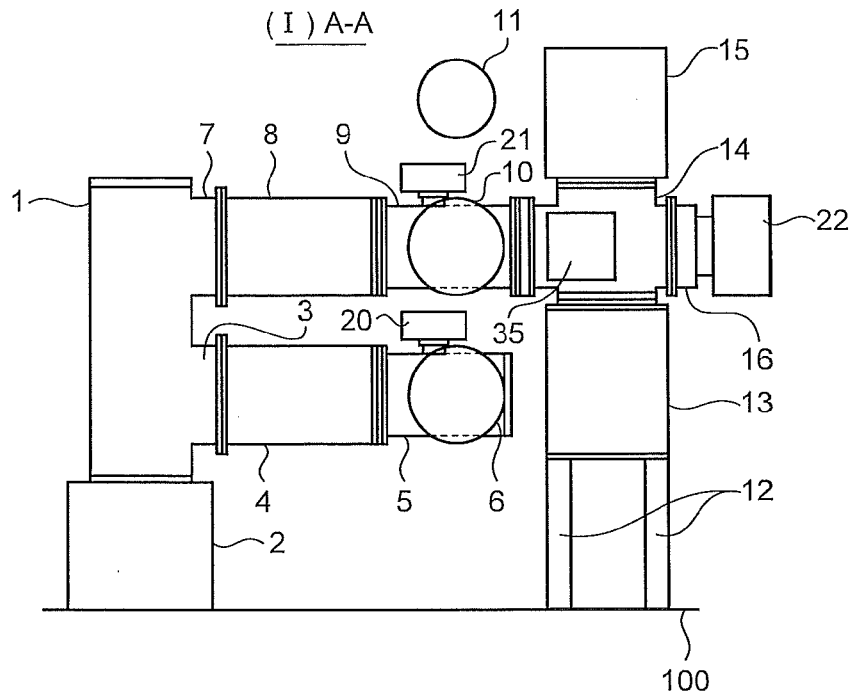
FIG. 3 is a section view corresponding to FIG. 1 viewed from the direction of arrows A-A, for showing the structure of a unit (I), which is a structural element of the gas insulated switchgear.
Figure 4:
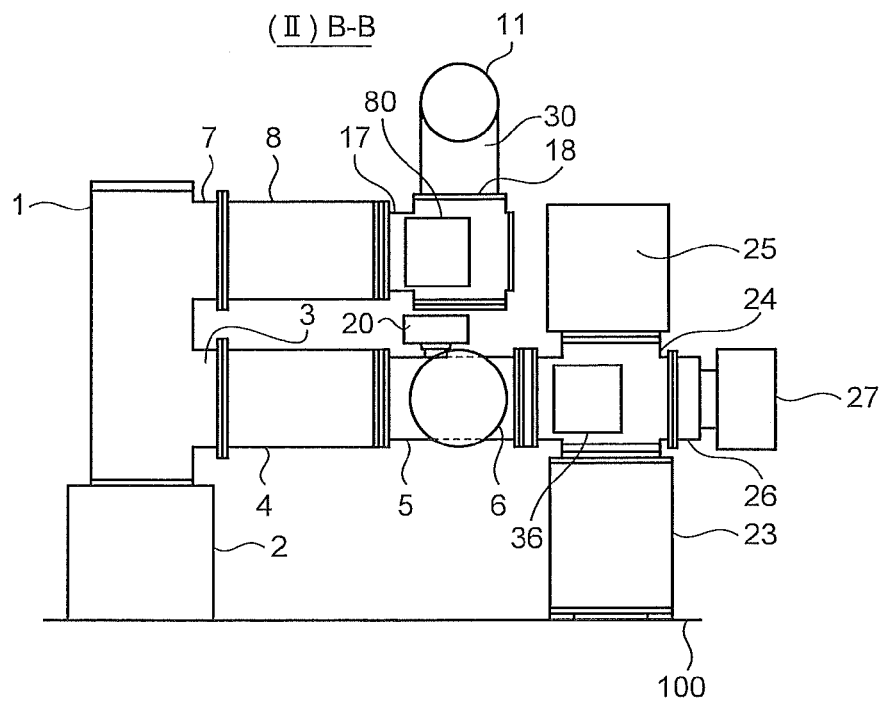
FIG. 4 is a section view corresponding to FIG. 1 viewed from the direction of arrows B-B, for showing the structure of a unit (II), which is a structural element of the gas insulated switchgear.
Figure 5:
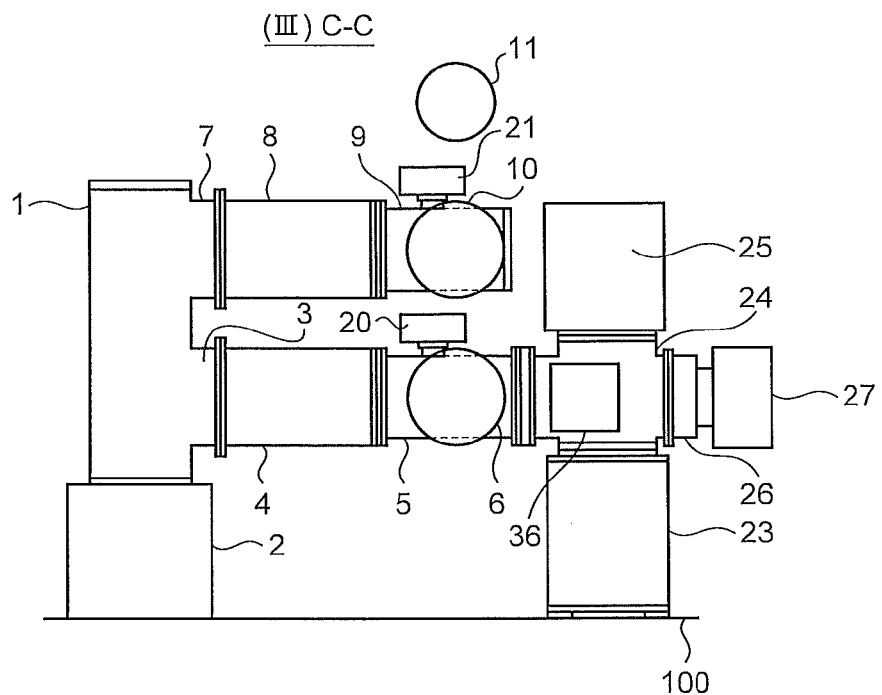
FIG. 5 is a section view corresponding to FIG. 1 viewed from the direction of arrows C-C, for showing the structure of a unit (III), which is a structural element of the gas insulated switchgear.
Figure 6:
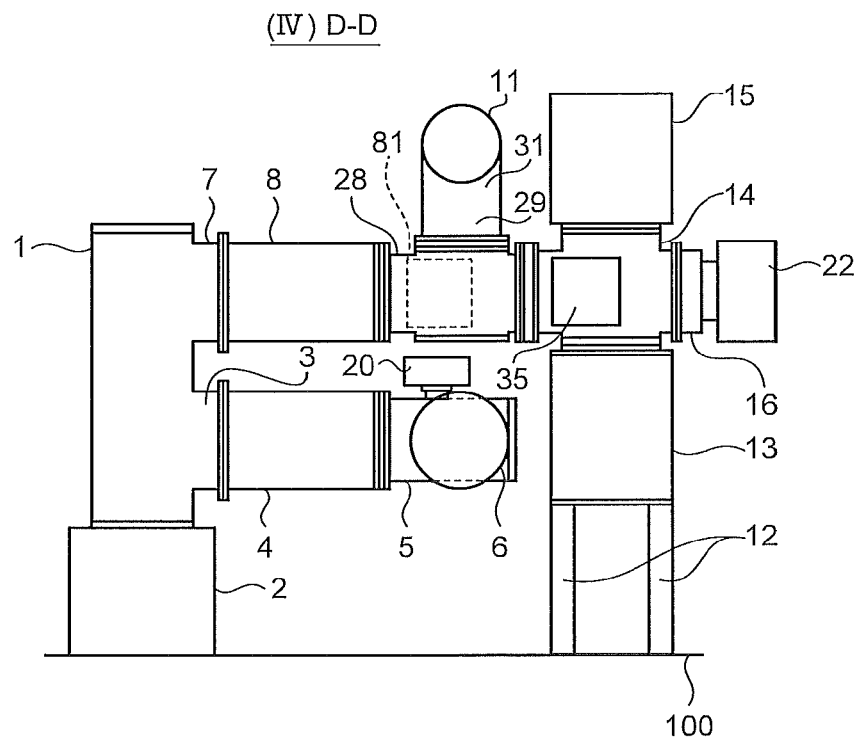
FIG. 6 is a section view corresponding to FIG. 1 viewed from the direction of arrows D-D, for showing the structure of a unit (IV), which is a structural element of the gas insulated switchgear.
Figure 7:
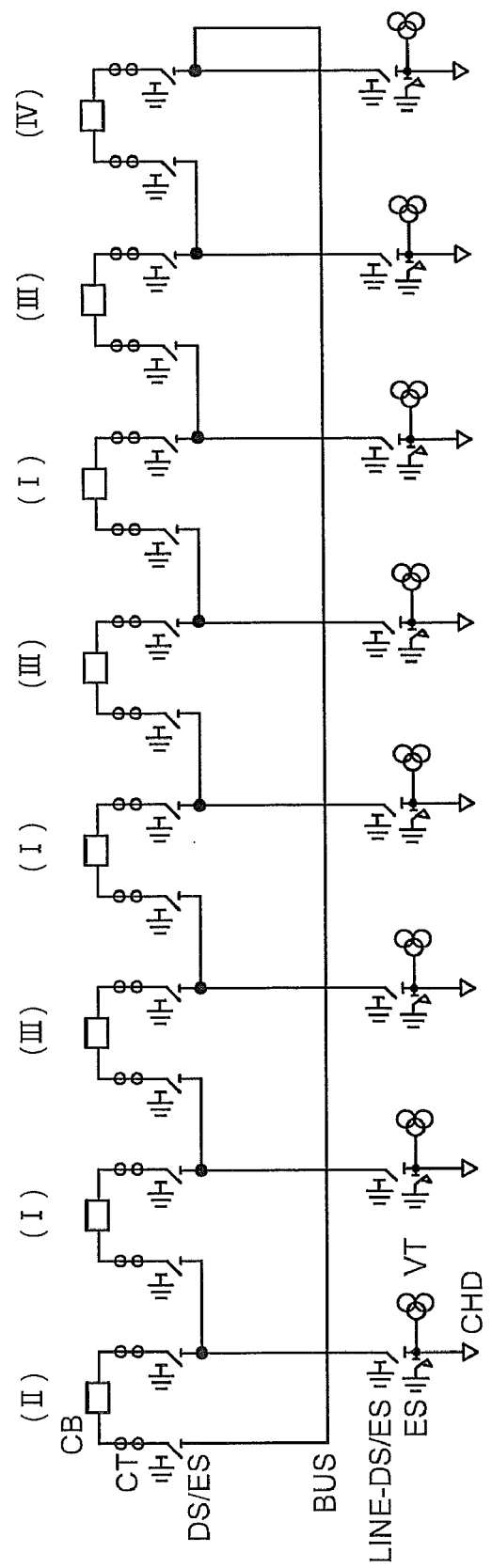
FIG. 7 is a single-line diagram according to the first embodiment.

The arrangement of ring-bus-type gas insulated switchgear according to the present embodiment is explained with reference to FIGS. 1 to 7. FIG. 1 is a front view of an example arrangement of the ring-bus-type gas insulated switchgear according to the present embodiment. FIG. 2 is a top view corresponding to FIG. 1. FIG. 3 is a section view of the structure of a unit (I), which is a structural component of the gas insulated switchgear, viewed from the direction of arrows A-A of FIG. 1. FIG. 4 is a section view of the structure of a unit (II), which is a structural component of the gas insulated switchgear, viewed from the direction of arrows B-B of FIG. 1. FIG. 5 is a section view of the structure of a unit (III), which is a structural component of the gas insulated switchgear, viewed from the direction of arrows C-C of FIG. 1. FIG. 6 is a section view of the structure of a unit (IV), which is a structural component of the gas insulated switchgear, viewed from the direction of arrows D-D of FIG. 1. FIG. 7 is a single-line diagram of the present embodiment.

First, the structures of the structural components of the gas insulated switchgear, the units (I) to (IV), are individually explained with reference to FIGS. 3 to 6, and then the overall layout is explained with reference to FIGS. 1, 2, and 7.

First, the structure of the unit (I) is explained. As illustrated in FIG. 3, a cylindrical breaker 1 having an operating device 2 in its lower portion is situated upright in such a manner that the axis line thereof is vertical to an installation surface 100. In other words, the breaker 1 is a vertical breaker, and a breaking unit (not shown) is provided in the inside thereof, which is filled with an insulating and arc-extinguishing gas such as $SF_6$. The operating device 2 may be arranged in the top portion of the breaker 1, and the same holds for all the breakers 1 and their operating devices 2 that are dealt with later.

Two branch ports, a lower branch port 3 and an upper branch port 7, are vertically arranged in the side surface of the breaker 1 and spaced apart from each other. These branch ports 3 and 7 are branched from the side surface of the breaker 1 and drawn vertically in the same direction.

An instrument current transformer 4 and a disconnector 5 having a grounding switch for breaker inspection are connected in series in this order to the branch port 3. A connection bus 6 extending in a direction orthogonal to the longitudinal directions of the breaker 1 and the instrument current transformers 4 and 8 is connected to the disconnector 5. Furthermore, an operating device 20 is arranged on top of the disconnector 5 for its operation.

An instrument current transformer 8 and a disconnector 9 having a grounding switch for breaker inspection are connected in series in this order to the branch port 7. A connection bus 10 extending in a direction orthogonal to the longitudinal directions of the breaker 1 and the instrument current transformers 4 and 8 is connected to the disconnector 9. Furthermore, an operating device 21 is arranged on top of the disconnector 9 for its operation. As described later, the connection bus 6 and the connection bus 10 in FIG. 3 extend in opposite directions.

The following components are positioned opposite to the breaker 1 across the disconnectors 5 and 9: a cable head 13, which is arranged on a supporting stand 12; a line-side disconnector 14 having a grounding switch for the connection bus, which is connected to the top portion of the cable head 13; an operating device 35 for the line-side disconnector 14, which is arranged on the side surface of the line-side disconnector 14; an instrument transformer 15, which is arranged on top of the line-side disconnector 14; a grounding switch 16 for the line-side grounding, which is connected to the line-side disconnector 14 and arranged on a side surface of the line-side disconnector 14 that is opposite to the breaker 1; and an operating device 22, which is arranged for the operation of the grounding switch 16. Furthermore, the line-side disconnector 14 is connected to the disconnector 9, which is connected to the breaker 1. The connection portion of the disconnector 9 is provided opposite to the connection portion between the disconnector 9 and the instrument current transformer 8, on the other side with respect to the instrument current transformer 8. In other words, the disconnector 9 has a T-branch structure, where the branch portion to which the instrument current transformer 8 is connected and the branch portion to which the line-side disconnector 14 is connected are opposite to each other, and the connection bus 10 is connected to a branch portion orthogonal to these opposing branch portions. In addition, a connection terminal is provided in each of the branch portions. In such a manner, the disconnector 9 is T-branched on a horizontal plane parallel to the installation surface 100. Similarly, the disconnector 5 also has a T-branch structure. It should be noted, however, that two of the T branch portions of the disconnector 5 are connected to the devices, which are the instrument current transformer 4 and the connection bus 6.

A communication bus 11 extending in a direction orthogonal to the longitudinal directions of the breaker 1 and the instrument current transformers 4 and 8 is arranged above the disconnector 9.

As described above, in the unit (I), the vertical breaker 1 having the branch ports 3 and 7, the instrument current transformers 4 and 8, and the disconnectors 5 and 9 having a grounding switch for breaker inspection form a breaker unit, and the line-side devices such as the cable head 13, the line-side disconnector 14, and the instrument transformer 15 are connected in such a manner to oppose this breaker unit across the disconnectors 5 and 9.

Next, the structure of the unit (II) is explained. As illustrated in FIG. 4, the arrangement of the vertical breaker 1, the operating device 2 for this breaker 1, the branch ports 3 and 7 on the side surface of the breaker 1, the instrument current transformer 4 and the disconnector 5 having a grounding switch for breaker inspection, which are connected in series in this order to the branch port 3, the connection bus 6 connected to the disconnector 5, and the operating device 20 for the disconnector 5 is the same as that of the unit (I). Moreover, the instrument current transformer 8 and a disconnector 17 having a grounding switch for breaker inspection are connected in series in this order to the branch port 7, which is the upper branch port of the breaker 1. An operating device 80 for the disconnector 17 is arranged on the side surface of the disconnector 17.

The disconnector 17 has a T-branch structure, and includes a branch portion to which the instrument current transformer 8 is connected, a branch portion opposite to this branch portion, to which no device is connected, and a branch portion facing upward. Then, a branch port 30 branching downward from the communication bus 11 is connected to a connection terminal 18 of the upward branch portion. In other words, the disconnector 17 is connected to the communication bus 11. In this manner, the disconnector 17 is T-branched on a plane perpendicular to the installation surface 100.

The following components are positioned opposite to the breaker 1 across the disconnectors 5 and 17 having a grounding switch for breaker inspection: a cable head 23, which is arranged on the installation surface; and a line-side disconnector 24 having a grounding switch for connection bus grounding, which is connected to the top portion of this cable head 23; an operating device 36 for the line-side disconnector 24, which is arranged on the side surface of this line-side disconnector 24; an instrument transformer 25, which is arranged on the top portion of the line-side disconnector 24; a grounding switch 26 for line-side grounding, which is connected to the line-side disconnector 24 and arranged on the side surface of the line-side disconnector 24 that is the opposite side to the breaker 1; and an operating device 27, which is arranged for operating this grounding switch 26. Furthermore, the line-side disconnector 24 is connected to the disconnector 5 that is connected to the breaker 1, and this connection portion of the disconnector 5 is provided on the side opposite to the instrument current transformer 4 in such a manner as to oppose the connection portion between the disconnector 5 and the instrument current transformer 4. In other words, the disconnector 5 has a T-branch structure, where the branch portion to which the instrument current transformer 4 is connected and the branch portion to which the line-side disconnector 24 are opposite to each other, and the connection bus 6 is connected to the branch portion that extends in a direction orthogonal to these opposing branch portions. In this manner, the disconnector 5 is T-branched on a horizontal plane parallel to the installation surface 100.

As described above, in the unit (II), the vertical breaker 1 having the branch ports 3 and 7, the instrument current transformers 4 and 8, and the disconnectors 5 and 17 each having the grounding switch for breaker inspection form a breaker unit, and the line-side devices such as the cable head 23, the line-side disconnector 24, and the instrument transformer 25 are connected in such a manner to oppose this breaker unit across the disconnectors 5 and 17.

Next, the structure of the unit (III) is explained. In FIG. 5 for showing the structure of the unit (III), the same structural components as those of FIG. 4 are given the same numerals, and thus the following explanation focuses on structural components different from FIG. 4. As illustrated in FIG. 5, the instrument current transformer 8 and the disconnector 9 having a grounding switch for breaker inspection are connected in series in this order to the upper branch port 7 of the breaker 1. Further, the disconnector 9 has a T-branch structure in a similar manner to the unit (I), and the connection bus 10 is arranged to extend in a direction orthogonal to the longitudinal directions of the breaker 1 and the instrument current transformers 4 and 8. In addition, the operating device 21 is arranged for operation on the top portion of the disconnector 9. Moreover, the communication bus 11 extending in the direction orthogonal to the longitudinal directions of the breaker 1 and the instrument current transformers 4 and 8 is arranged above the disconnector 9. The arrangement of the disconnector 5 having a grounding switch for breaker inspection connected to the lower branch port 3 of the breaker 1 by way of the instrument current transformer 4 and the line-side devices connected to this disconnector 5, which are the cable head 23, the line-side disconnector 24 having a grounding switch for connection bus grounding, the operating device 36, the instrument transformer 25, the grounding switch 26 for line-side grounding, and the operating device 27 is the same as that of FIG. 4. Furthermore, as discussed later, the extending directions of the connection bus 6 and the connection bus 10 in FIG. 5 are opposite to each other.

As described above, in the unit (III), the vertical breaker 1 having the branch ports 3 and 7, the instrument current transformers 4 and 8, and the disconnectors 5 and 9 each having the grounding switch for breaker inspection form a breaker unit, and the line-side devices such as the cable head 23, the line-side disconnector 24, and the instrument transformer 25 are connected to oppose the breaker unit across the disconnectors 5 and 9.

Next, the structure of the unit (IV) is explained. As indicated in FIG. 6, the instrument current transformer 8 and a disconnector 28 having a grounding switch for breaker inspection are connected in series in this order to the upper branch port 7 of the breaker 1. An operating device 81 for the disconnector 28 is attached to the side surface of the disconnector 28. In addition, the disconnector 28 has a T-branch structure, which includes a branch portion to which the instrument current transformer 8 is connected, a branch portion opposite to this branch portion, to which the line-side disconnector 14 having a grounding switch for connection bus grounding is connected, and a branch portion facing upward. Then, a branch port 31 that is branched downward from the communication bus 11 is connected to a connection terminal 29 of the upward branch portion. In other words, the disconnector 28 is connected to the communication bus 11. In this manner, the disconnector 28 is T-branched on a plane perpendicular to the installation surface 100.

In addition, as described above, the line-side disconnector 14 having the grounding switch for connection bus grounding is connected to the disconnector 28, and the connection portion of the disconnector 28 is provided on the side opposite to the instrument current transformer 8 so that it opposes the connection portion between the disconnector 28 and the instrument current transformer 8. The rest of the structure of FIG. 6 is the same as FIG. 1. Thus, the same structural components are given the same numerals, and the detailed explanation is omitted.

As discussed above, in the unit (IV), the vertical breaker 1 having the branch ports 3 and 7, the instrument current transformers 4 and 8, and the disconnectors 5 and 28 each having the grounding switch for breaker inspection form a breaker unit, and the line-side devices such as the cable head 13, the line-side disconnector 14, and the instrument transformer 15 are connected in such a manner to oppose the breaker unit across the disconnectors 5 and 28.

Next, the single-line diagram according to the present embodiment is explained. As indicated in FIG. 7, eight breaker units that each include an instrument current transformer (CT) and a disconnector (DS/ES) having a ground switch in sequence on the each of the two sides of the breaker (CB) are connected to one another in series. In addition, the breaker units are connected by a connection line that connects the disconnectors (DS/ES). These eight breaker units, include the units (II), (I), (III), (I), (III), (I), (III), and (IV) that are connected in series. Moreover, the breaker units positioned at the two ends in the direction of the connection, the breaker units of the units (II) and (IV) are connected to each other by way of a communication bus (BUS), so that a ring bus structure is formed. Branch lines are drawn from the connection line connecting the breaker units, and each branch line is connected to a cable head (CHD) by way of a line-side disconnector (LINE-DS/ES) having a grounding switch. Furthermore, a grounding switch (ES) for line-side grounding and an instrument transformer (VT) are connected to the connection line connecting the line-side disconnector (LINE-DS/ES) having the grounding switch to the cable head (CHD). As an example of the present embodiment, the explanation is made herein about the case where the number of units are eight. However, the number is not limited thereto, and gas insulated switchgear having a different number of units can be achieved by suitably adding or reducing units (III) and (I).

Next, the layout according to the present embodiment is explained in detail below with reference to FIGS. 1 to 6. First, as illustrated in FIGS. 1 and 2, the ring-bus-type gas insulated switchgear according to the present embodiment includes, from left to right of the drawing, the units (II), (I), (III), (I), (III), (I), (III), and (IV) that are connected linearly in series. Eight breakers 1 are arranged in correspondence with the breakers provided in these eight units, and all the branch ports 3 and 7 of the eight breakers 1 face the same direction. In other words, by orienting the branch ports 3 and 7 in the same direction, the eight units are aligned in parallel with one another. Furthermore, the eight units are arranged linearly in a direction orthogonal to the branching direction of the branch ports 3 and 7, which is the direction orthogonal to the longitudinal directions of the breakers 1 and the instrument current transformers 4 and 8. Regarding the arrangement of the units, any description of units can be replaced with that of breaker units if breaker units do not need to be differentiated from the units. For example, the above description of the unit arrangement still holds when the units are replaced with breaker units, which are structural components of the units.

Here, to describe the connection of the units in detail, the connection of the units of FIGS. 1 and 2 from the left to the right is explained. First, the unit (II) is connected to the unit (I) adjacent thereto by the connection bus 6. More specifically, the disconnector 5 of the unit (II) and the disconnector 5 of the unit (I) are connected by the connection bus 6. As described previously, the disconnector 5 is a disconnector connected to the lower branch port 3 of the breaker 1. Thus, by connecting the lower disconnectors 5 to each other by the connection bus 6, the unit (II) and its adjacent unit (I) are connected to each other.

Next, the unit (I) is connected to its adjacent unit (III) on the right by the connection bus 10. More specifically, the disconnector 9 of the unit (I) and the disconnector 9 of the unit (III) are connected by the connection bus 10. As described previously, the disconnector 9 is a disconnector connected to the upper branch port 7 of the breaker 1. Thus, by connecting the upper disconnectors 9 to each other by the connection bus 10, the unit (I) and its adjacent unit (III) on the right are connected to each other.

Then, the unit (III) is connected to its adjacent unit (I) on the right by the connection bus 6. More specifically, the disconnector 5 of the unit (III) and the disconnector 5 of the unit (I) are connected to each other by the connection bus 6. Thus, in this case, the unit (III) and its adjacent unit (I) on the right are connected to each other by connecting the lower disconnectors 5 to each other by the connection bus 6.

Thereafter, the unit (I) is connected to its adjacent unit (III) on the right by the connection bus 10, and the unit (III) and its adjacent unit (I) on the right are connected by the connection bus 6. Furthermore, the unit (I) and its adjacent unit (III) on the right are connected by the connection bus 10. The details of the description are the same as the above.

Moreover, the unit (III) is connected to its adjacent unit (IV) on the right by the connection bus 6. More specifically, the disconnector 5 of the unit (III) and the disconnector 5 of the unit (I) are connected to each other by the connection bus 6. Thus, in this case, the unit (III) and its adjacent unit (IV) on the right are connected by connecting the lower disconnectors 5 to each other by the connection bus 6.

In this manner, the upper disconnectors or the lower disconnectors of any adjacent units are connected to each other by the connection bus 10 or 6, and, as the entire structure, the connection buses 10 and 6 are arranged alternately in the alignment direction of the units. The connection bus 10 is arranged above the connection bus 6, or in other words, the connection buses are arranged alternately at upper and lower levels with respect to the alignment direction. Hence, the bus route vertically forms a zigzag pattern.

In addition, the eight units are arranged in such a manner that long and short distances are alternately determined between adjacent units in the alignment direction. For example, regarding the three units at the left end of FIGS. 1 and 2, i.e. the units (II), (I), and (III), a distance a between the unit (II) and the unit (I) is shorter than a distance b between the unit (I) and the unit (III) (a<b). Then, in FIGS. 1 and 2, the distances between the units from the left to the right of the drawings are determined to be short and long in alternate order such as a, b, a, b, a, b, and a. The connection bus 10 is configured to have a length greater than that of the connection bus 6 in correspondence with the design of the distances between the units. In this manner, two adjacent units are paired up, and the distance between this pair and its adjacent pair is determined to be greater than the distance between the units that constitute the pair.

The disconnector 17 of the unit (II) at the left end in the alignment direction is connected to the communication bus 11 by way of the branch port 30 provided in the communication bus 11. Further, the disconnector 28 of the unit (IV) at the right end in the alignment direction is connected to the communication bus 11 by way of the branch port 31 provided in the communication bus 11. As described previously, the disconnector 17 of the unit (II) is not connected to the disconnector of its adjacent unit (I) by the communication bus, and the disconnector 28 of the unit (IV) is not connected to the disconnector of its adjacent unit (III) by the communication bus. The communication bus 11 is linearly arranged parallel to the alignment direction in such a manner as to cross the eight units.

According to the present embodiment, the two branch ports 3 and 7 of each of the breaker units are oriented in the same direction, and the units are linearly arranged in a direction orthogonal to this direction. Furthermore, the line-side devices are positioned to oppose the corresponding breaker units across the disconnectors 5 and 9, 17, and 28. The devices are thereby gathered in front and back of the breaker units. In other words, mainly the breaker 1 is arranged on the front side of a breaker unit, and mainly the line-side devices are arranged on the back side of the breaker unit. Hence, these devices can be easily accessed, and space necessary for maintenance and inspection is automatically ensured. For example, in FIG. 2, the breaker 1 and the grounding switches 16 and 26 do not require space specially for maintenance and inspection, and the operating devices 2, 22, and 27 that operate these components become easily accessible. In this manner, according to the present embodiment, the devices are gathered in front and back of the units so that arrangement of space specially for device maintenance and inspection is not required and the installation space can be reduced.

Furthermore, according to the present embodiment, the distances between the units and the dimension in the unit length direction can be reduced by arranging the units in parallel. The layout of the entire electric-power-related facility in which the gas insulated switchgear is installed can thereby be integrated, and a small footprint can be readily realized. This is especially effective when the line-side devices are connected by cables.

In addition, according to the present embodiment, the vertical breakers 1 each having the upper and lower branch ports 3 and 7 that are spaced apart are incorporated, and the disconnectors 5, 9, 17, and 28 connected to these breakers 1 by way of the instrument current transformers 4 and 8 are connected to the connection buses 6 and 10. For this reason, in comparison with the conventional technology in which a current transformer and a disconnector are connected to a horizontal branch (T branch) arranged on top of the vertical breaker 1 (see Patent Document 1), the bus does not need to be arranged at a high level. This allows the devices to be arranged at a lower level, which largely reduces the number of supporting stands. This reduces the cost and also improves the earthquake protection. In addition, with such a structure of the breaker 1, no fold-over structure for conductors is required inside the breaker 1. Because the conductor routing structure is simplified, the diameter of the breaker can be reduced. As a result, the distance between the units can be reduced, and the installation space can be reduced.

According to the present embodiment, the disconnectors 5, 9, 17, and 28 are configured to have a T-branch structure. Thus, the number of tanks and spacers for connecting the devices can be reduced, which results in the reduction of the installation space and the cost.

Furthermore, according to the present embodiment, the communication bus 11 is linearly arranged to cross the units. Due to this arrangement, the length of the communication bus 11 can be minimized, and the number of tanks and spacers for the communication bus 11 can be reduced. Thus, the installation space can be reduced, and the cost can be reduced. In this structure, the communication bus 11 is arranged above the disconnectors 5, 9, 17, and 28, but it may be arranged below the disconnectors 5, 9, 17, and 28. In this case, it is preferable that the lower disconnectors of the units (II) and (IV) positioned at the ends of the alignment direction be connected to the communication bus arranged below the disconnectors 5, 9, 17, and 28. In the structure in which the communication bus 11 is arranged above the disconnectors 5, 9, 17, and 28, installation of the devices and addition of units can be easily conducted. On the other hand, in the structure in which the communication bus 11 is arranged below the disconnectors 5, 9, 17, and 28, the earthquake protection can be improved.

Moreover, according to the present embodiment, one of the line-side devices is connected to one unit. In this manner, the length of units can be reduced. The structure may be such that two of the line-side devices are connected to one unit.

Still further, according to the present embodiment, the units are arranged in such a manner that the distances between the adjacent units are determined to be short and long, or long and short, in alternate order with respect to the alignment direction. For example, in FIGS. 1 and 2, the distance between the unit (I) and the unit (III) (at three positions) is greater than the distance between any other pairs of units. Thus, by using the space, for example, between the unit (I) adjacent to the unit (II) and the unit (III) on its right in FIG. 2, the operating devices for both of the disconnector 9 or the like of the unit (I) and the disconnector 9 or the like of the unit (III) become easily accessible, which improves the maintenance and inspection performance. Especially because the space for maintenance and inspection is shared effectively by two adjacent disconnectors, the dimensions in the unit-to-unit direction of the entire electric-power-related facility can be reduced. The structure may be such that the operation devices 20, 21, 80, and 81 of the disconnectors 5, 9, 17, and 28 of the disconnectors are brought to the front and back sides of the units by coupling mechanism, or that the space for maintenance and inspection is provided between the disconnectors 5, 9, 17, and 28 and the line-side devices and the inspection space provided for every two units according to the present embodiment is not used.

Second Embodiment

The arrangement and structure of ring-bus-type gas insulated switchgear according to the present embodiment is explained with reference to FIGS. 8 to 14. According to the present embodiment, the gas insulated switchgear is configured to have a structure suitable for adding units thereto.

Figure 8:
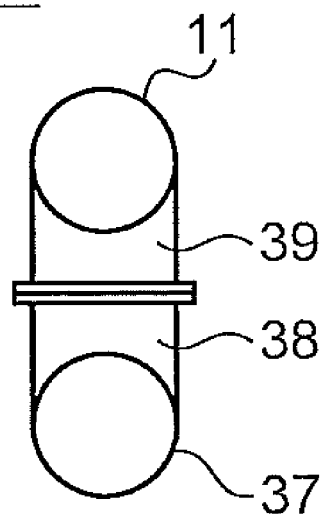
FIG. 8 is a section view corresponding to FIG. 9 viewed from the direction of arrows E-E, for showing the structure of a unit (V), which is a structural element of the gas insulated switchgear.
Figure 9:
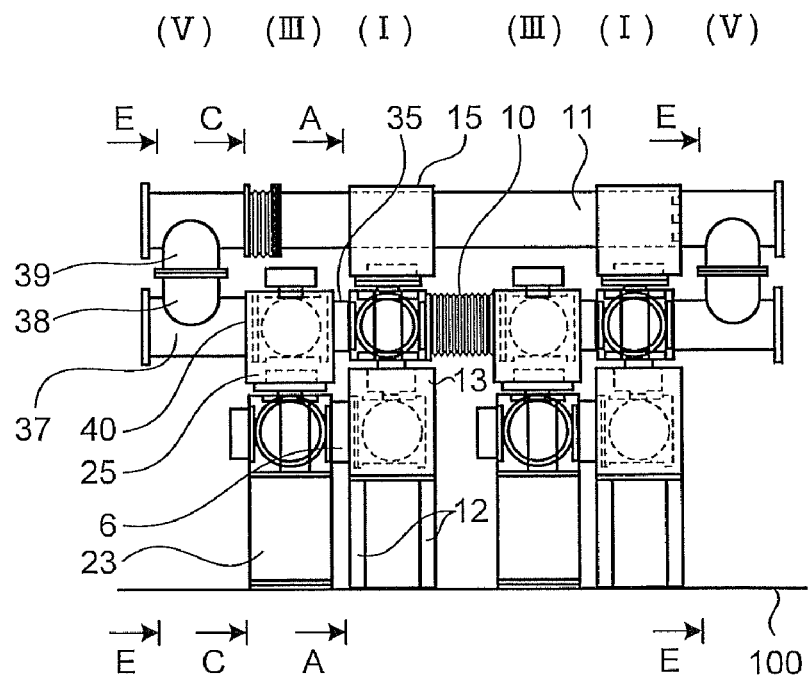
FIG. 9 is a front view of an example arrangement of ring-bus-type gas insulated switchgear according to the second embodiment, which is an arrangement before addition is made.
Figure 10:
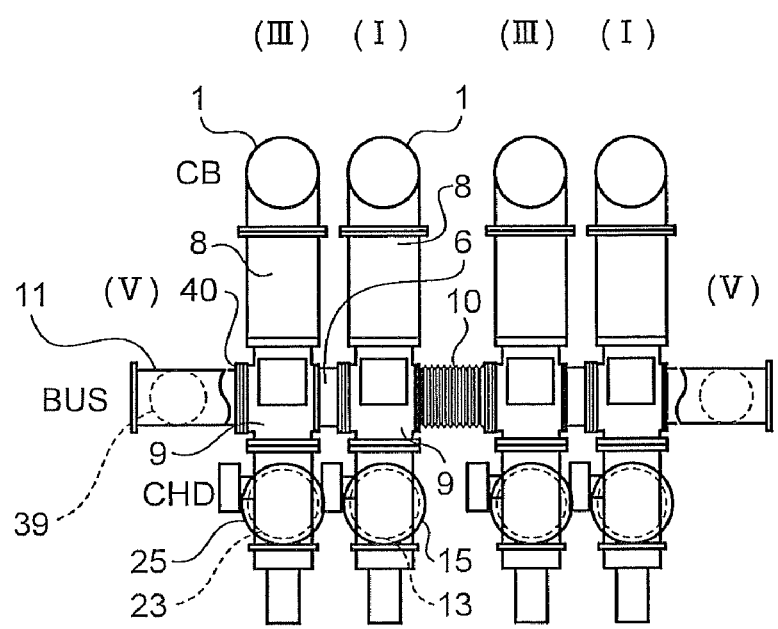
FIG. 10 is a top view corresponding to FIG. 9.

FIG. 9 is a front view of an example structure of the ring-bus-type gas insulated switchgear before the addition according to the present embodiment. Further, FIG. 10 is a top view corresponding to FIG. 9. FIG. 8 is a section view of the structure of a unit (V) that is a structural component of the gas insulated switchgear, viewed from the direction of arrows E-E of FIG. 9. As illustrated in FIG. 8, the unit (V) is a connection unit that does not include a breaker unit.

As illustrated in FIGS. 9 and 10, according to the present embodiment, the units (V) are arranged at the two ends of the alignment direction, and the units (V), (III), (I), (III), (I), and (V) are aligned from the left to the right of the drawings. Here, the structures of the units (III) and (I) are the same as the first embodiment. Moreover, the same structural components as those of FIGS. 1 to 6 are given the same numerals in FIGS. 9 and 10, and the detailed explanation thereof is omitted below.

The manner of connection between the units is the same as the first embodiment. For example, the unit (III) is connected to its adjacent unit (I) on the right by way of the connection bus 6, and the unit (I) is connected to its adjacent unit (III) on the right by way of the connection bus 10. The connection buses 6 and 10 are arranged alternately at high and low levels with respect to the alignment direction.

Next, as illustrated in FIGS. 8 to 10, the unit (V) at the left end of the unit alignment and its adjacent unit (III) are connected by way of a connection bus 37, which is a structural component of the unit (V). More specifically, a connection terminal 40 is provided in the upper disconnector 9 of the unit (III) to extend on the side of the unit (V) (i.e., on the side of the unit (III) opposite to its adjacent unit (I) on the right), and the disconnector 9 and the connection bus 37 are connected to each other by way of the connection terminal 40. The connection bus 37 is, as illustrated in the drawings, a connection bus for connecting the disconnector 9 and the communication bus 11. It extends a requisite minimum length from the connection terminal 40 in a direction opposite to the unit (I), which is on the right of the unit (III), and further includes a branch port 38 that is drawn upward on its top surface. The communication bus 11 extends to the position of the connection bus 37. By connecting the branch port 39 arranged in the communication bus 11 and drawn downward and the branch port 38 arranged in the connection bus 37, the disconnector 9 and the communication bus 11 are connected to each other. In this manner, of the two disconnectors of the breaker unit of the unit (III) adjacent to the left-end unit (V), the disconnector (disconnector 9) that is not connected to the disconnector of its adjacent breaker unit is provided with the connection terminal 40 on the side opposite to the adjacent breaker unit. The same description is applied to the manner of connection between the unit (V) at the right end of the unit alignment and its adjacent unit (I).

Figure 11:
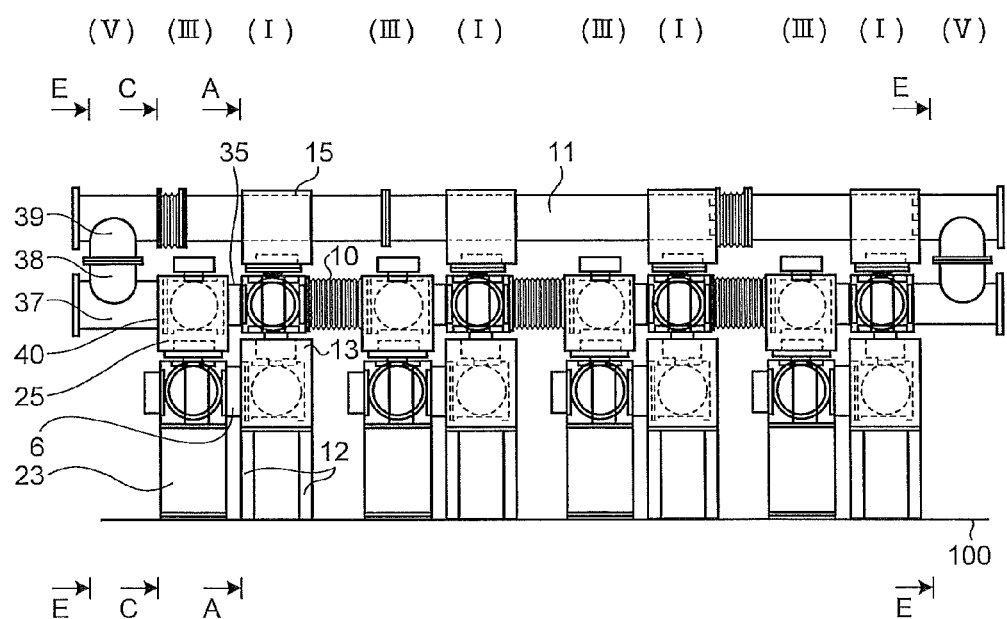
FIG. 11 is a front view of an example arrangement of the ring-bus-type gas insulated switchgear according to the second embodiment, which is an arrangement after addition is made.

Next, when the gas insulated switchgear illustrated in FIGS. 9 and 10 is the structure before the addition of units, a situation of adding units to increase the number of units is explained. FIG. 11 is a front view of an example structure of the ring-bus-type gas insulated switchgear according to the present embodiment, after the addition. Further, FIG. 12 is a top view corresponding to FIG. 11.

Figure 12:
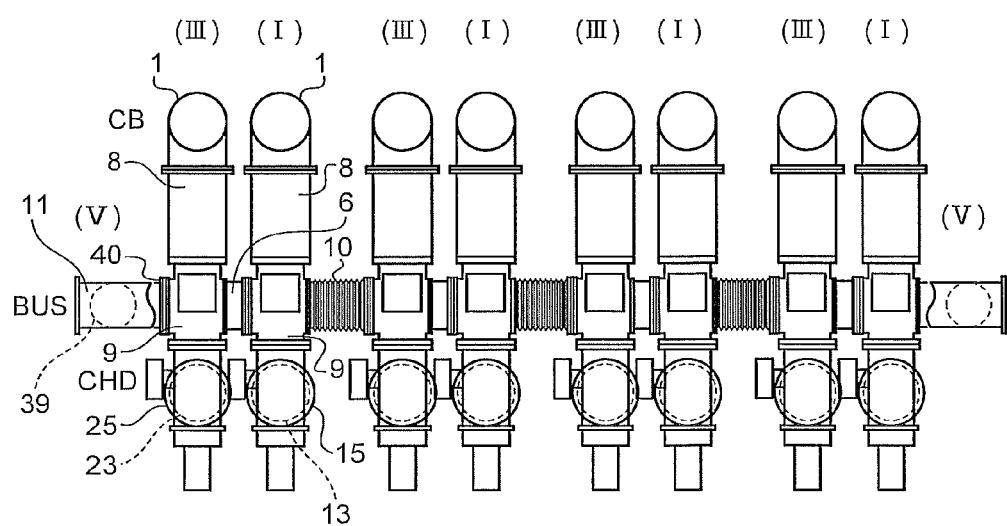
FIG. 12 is a top view corresponding to FIG. 11.

In the example of addition illustrated in FIGS. 11 and 12, two pairs of adjacent units (III) and (I) are added in comparison with the pre-addition structure. In other words, in the illustrated example, the units (V) are arranged at the two ends of the alignment direction, and the units (V), (III), (I), (III), (I), (III), (I), (III), (I), and (V) are positioned from the left to the right of the drawings. When it is compared with the pre-addition structure, four units are added.

As the procedure of addition, in the structure of FIGS. 9 and 10, first, the connection buses are removed from the units (V) at the ends of the unit alignment direction (the connection bus 37 for the left end), and a pair of units (III) and (I) are aligned at each of the ends of the alignment direction of the already aligned units. Thereafter, as illustrated in FIGS. 11 and 12, the connection buses are placed back, and the units (V) are arranged at the ends of the unit alignment direction to form a ring structure.

Instead of arranging the units (V) at the ends of the unit alignment direction, the structure may be such that a unit (V) is arranged at either one of the ends, and the connection terminal of the disconnector at the other end may be configured to extend upward or downward, in the same manner as the first embodiment. In this case, units can be readily added in the direction in which the unit (V) is arranged, so that the unit addition direction is one way only.

Figure 13:
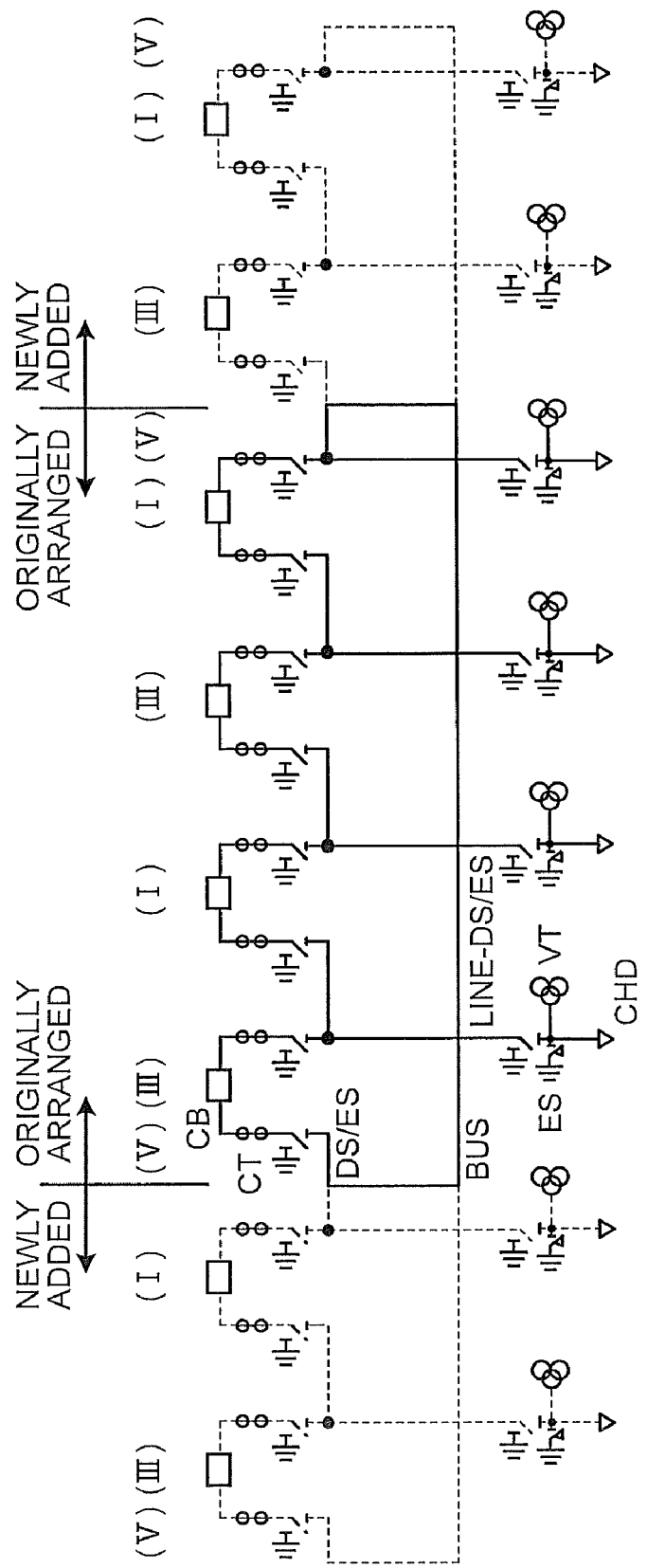
FIG. 13 is a single-line diagram according to the second embodiment before units are added.
Figure 14:
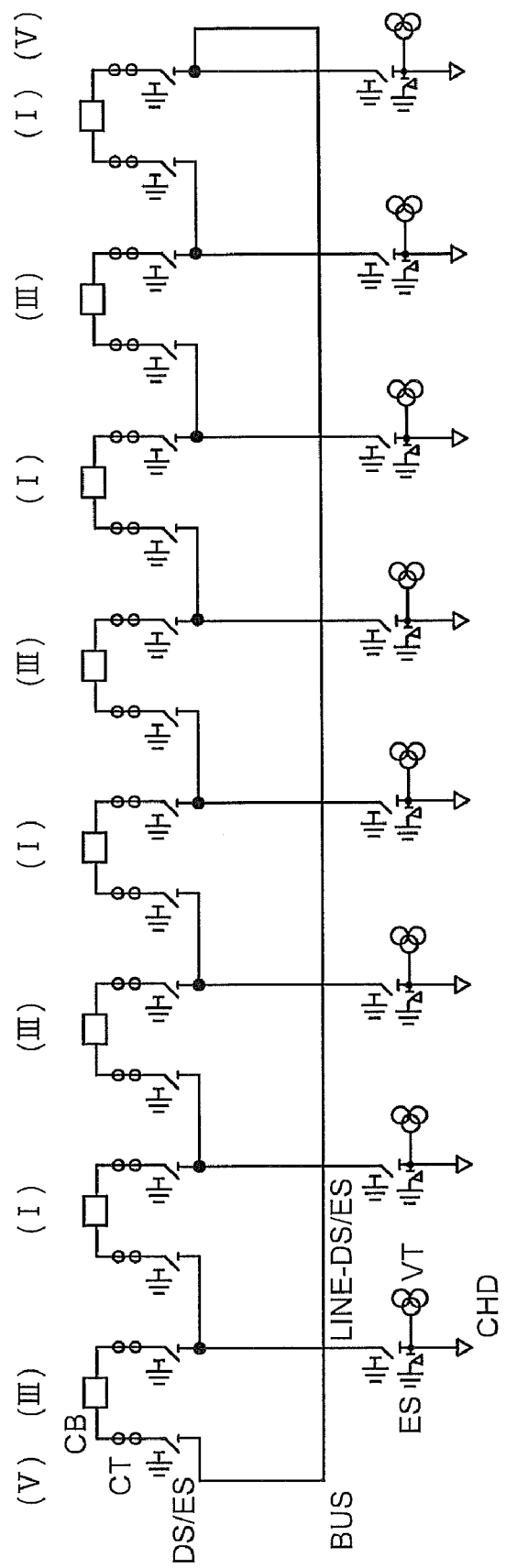
FIG. 14 is a single-line diagram according to the second embodiment after the units are added.

FIG. 13 is a single-line diagram before the addition of units according to the present embodiment, where pre-addition ("originally arranged" in the drawing) is indicated in solid lines, while post-addition ("newly added" in the drawing) is indicated in broken lines for the sake of comparison. In the example of FIG. 13, a pair of units (III) and (I) are added to each of the two ends of the already arranged units. Furthermore, FIG. 14 is a single-line diagram after the unit addition according to the present embodiment. The symbols and the like of FIGS. 13 and 14 are the same as FIG. 7, and thus the detailed explanation is omitted.

According to the present embodiment, the units are arranged in parallel to one another, and, for at least one of the breaker units arranged at the two ends of the alignment direction, the breaker provided in this breaker unit arranged at the end is provided with a connection terminal facing a direction opposite to its adjacent breaker unit. This facilitates removing and resetting of the unit (V), and facilitates the addition of units. The other effects of the present embodiment are the same as the first embodiment.

In the above explanation, a three-phase type is used as an example, but it should not be limited thereto, and it is equally applicable to a phase separation type.

INDUSTRIAL APPLICABILITY

As discussed above, the gas insulated switchgear according to the present invention is suitable for reduction of installation space in electric-power-related facilities such as power plants and substations.

The invention claimed is:

1. A gas insulated switchgear in which a plurality of breaker units are connected in series to form a ring bus and line-side devices are branched from between the breaker units, each of the breaker units including a vertical breaker provided with two branch ports that are an upper port and a lower port and are branched horizontally from a side surface thereof in the same direction, and an instrument current transformer and a disconnector that are connected in this order to each of the two branch ports, wherein:

the two branch ports of each of the breaker units face the same direction, the breaker units are arranged linearly in a direction orthogonal to the same direction, upper disconnectors or lower disconnectors of any two adjacent breaker units are connected by a connection bus, and the connection bus is arranged to run alternately at upper and lower levels with respect to an alignment direction of the breaker units;

a disconnector of two disconnectors of a breaker unit positioned at one end of the alignment direction, which is not connected to a disconnector of an adjacent breaker unit to the breaker unit, is connected by a communication bus to a disconnector of two disconnectors of a breaker unit at the other end of the alignment direction, which is not connected to a disconnector of an adjacent breaker unit to the breaker unit, so that the breaker units at the two ends of the alignment direction communicate with each other;

at least one of two disconnectors of each of the breaker units is connected to the line-side devices, and the line-side devices are arranged to face the breaker units across the disconnectors, the breaker units are arranged in such a manner that distances between any two adjacent breaker units are determined to be alternately long and short with respect to the alignment direction, and in at least all of the breaker units other than the breaker units positioned at the two ends of the alignment direction, an operating device of each of the two disconnectors that are respectively connected to the two branch ports is arranged to overlap each corresponding disconnector when seen in plane view from above.

2. The gas insulated switchgear according to claim 1, wherein each of the disconnectors has a T-branch structure, in which a branch portion to which the instrument current transformer is connected is arranged opposite to a branch portion connectable to a line-side device, and a connection bus connectable to a branch portion orthogonal to the branch portions that are opposite to each other.

3. The gas insulated switchgear according to claim 1, wherein the communication bus is arranged parallel to the alignment direction in such a manner as to cross the breaker units.

4. The gas insulated switchgear according to claim 1, wherein the disconnector of the two disconnectors of at least one of the breaker units positioned at the ends of the alignment direction, which is not connected to the disconnector of the adjacent breaker unit to the breaker unit, is provided with a connection terminal connectable to a connection bus on a side opposite to the adjacent breaker unit.

5. The gas insulated switchgear according to claim 1, wherein the line-side devices are connected individually to the breaker units.

6. The gas insulated switchgear according to claim 2, wherein the disconnector of the two disconnectors of at least one of the breaker units positioned at the ends of the alignment direction, which is not connected to the disconnector of the adjacent breaker unit to the breaker unit, is provided with a connection terminal connectable to a connection bus on a side opposite to the adjacent breaker unit.

7. The gas insulated switchgear according to claim 3, wherein the disconnector of the two disconnectors of at least one of the breaker units positioned at the ends of the alignment direction, which is not connected to the disconnector of the adjacent breaker unit to the breaker unit, is provided with a connection terminal connectable to a connection bus on a side opposite to the adjacent breaker unit.

8. The gas insulated switchgear according to claim 2, wherein the line-side devices are connected individually to the breaker units.

9. The gas insulated switchgear according to claim 3, wherein the line-side devices are connected individually to the breaker units.

10. The gas insulated switchgear according to claim 4, wherein the line-side devices are connected individually to the breaker units.

11. The gas insulated switchgear according to claim 6, wherein the line-side devices are connected individually to the breaker units.

12. The gas insulated switchgear according to claim 7, wherein the line-side devices are connected individually to the breaker units.

* * * * *